US011167156B2

(12) United States Patent
Royle et al.

(10) Patent No.: US 11,167,156 B2
(45) Date of Patent: Nov. 9, 2021

(54) SMOKE VENTILATION

(71) Applicant: David John Royle, Oadby (GB)

(72) Inventors: David John Royle, Leicestershire (GB);
Danish Ahmad, Leicestershire (GB)

(73) Assignee: David John Royle, Oadby (GB)

( * ) Notice: Subject to any disclaimer, the term of this patent is extended or adjusted under 35 U.S.C. 154(b) by 227 days.

(21) Appl. No.: 16/391,591

(22) Filed: Apr. 23, 2019

(65) Prior Publication Data

US 2019/0314653 A1 Oct. 17, 2019

Related U.S. Application Data

(62) Division of application No. 14/130,082, filed as application No. PCT/GB2012/051511 on Jun. 28, 2012, now Pat. No. 10,265,552.

(30) Foreign Application Priority Data

Jun. 30, 2011 (GB) .................................... 1111097

(51) Int. Cl.
*F24F 11/00* (2018.01)
*A62B 3/00* (2006.01)
*E04H 1/04* (2006.01)
*F24F 11/33* (2018.01)

(52) U.S. Cl.
CPC ............ *A62B 3/00* (2013.01); *F24F 11/0001* (2013.01); *E04H 1/04* (2013.01); *F24F 11/33* (2018.01); *F24F 2011/0004* (2013.01)

(58) Field of Classification Search
CPC ........ F24F 11/0001; F24F 11/006; F24F 7/06; F24F 2011/0056; F24F 7/007; F24F 2011/0061; Y02B 30/78
USPC .................................................. 454/342, 357
See application file for complete search history.

(56) References Cited

U.S. PATENT DOCUMENTS

| 3,169,382 | A | 2/1965 | Brown |
| 4,029,176 | A * | 6/1977 | Mills ....................... B66B 13/26 187/317 |
| 4,408,146 | A | 10/1983 | Beckerman |
| 5,036,620 | A | 8/1991 | Beran et al. |
| 5,178,597 | A | 1/1993 | Jones |
| 6,326,751 | B1 | 12/2001 | Mullet et al. |
| 6,660,054 | B2 * | 12/2003 | Manna ................. A61B 5/1172 106/31.03 |
| 7,040,457 | B1 | 5/2006 | Bene |
| 2007/0011947 | A1 | 1/2007 | Koponen |
| 2008/0050004 | A1 | 2/2008 | Silverbrook et al. |
| 2009/0290344 | A1 | 11/2009 | Chiang et al. |
| 2011/0190956 | A1 * | 8/2011 | Kunst ....................... G06F 1/28 700/292 |

FOREIGN PATENT DOCUMENTS

DE 20113242 U1 10/2001
DE 20208031 U1 8/2002
(Continued)

*Primary Examiner* — Vivek K Shirsat
*Assistant Examiner* — Ko-Wei Lin
(74) *Attorney, Agent, or Firm* — Roberts Calderon Safran & Cole, P.C.

(57) ABSTRACT

The invention provides door and window sensors, which can be incorporated into building pressurisation and depressurisation systems, for use in protecting a building's escape routes against smoke ingress during a fire.

6 Claims, 16 Drawing Sheets

(56) References Cited

FOREIGN PATENT DOCUMENTS

| | | | |
|---|---|---|---|
| DE | 202004016229 | U1 | 1/2005 |
| DE | 10260804 | A1 | 6/2008 |
| DE | 102006060744 | A1 | 6/2008 |
| DE | 202009012529 | * | 9/2009 |
| DE | 202009012529 | U1 | 2/2011 |
| EP | 0215316 | A2 | 3/1987 |
| EP | 1073211 | A2 | 1/2001 |
| JP | 2005201580 | A | 7/2005 |
| JP | 2006273189 | A | 10/2006 |
| JP | 2007198722 | A | 8/2007 |
| KR | 20110048425 | | 5/2011 |
| WO | 2004088075 | A1 | 10/2004 |
| WO | 2008014593 | A1 | 2/2008 |
| WO | 2010122903 | A1 | 10/2010 |

* cited by examiner

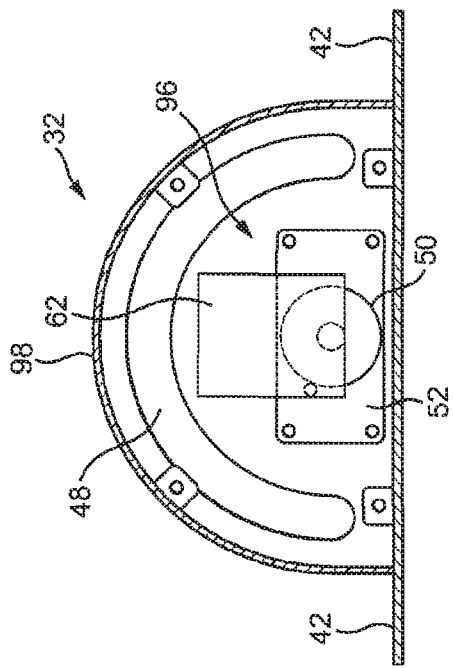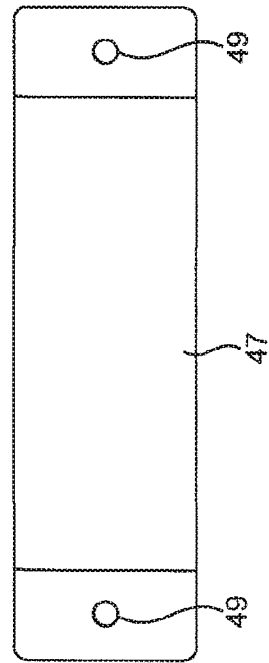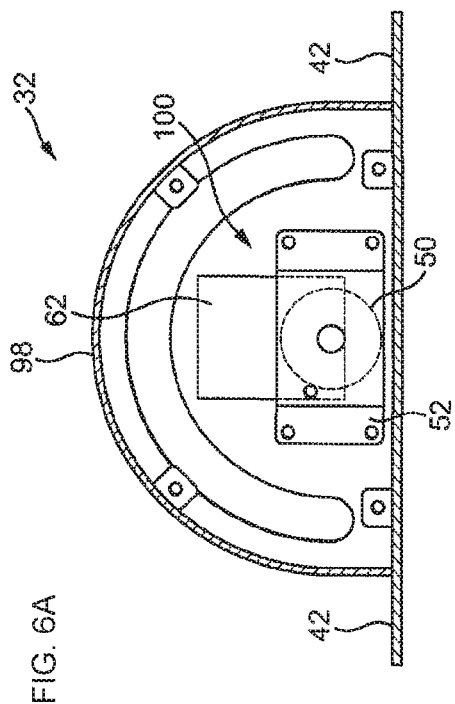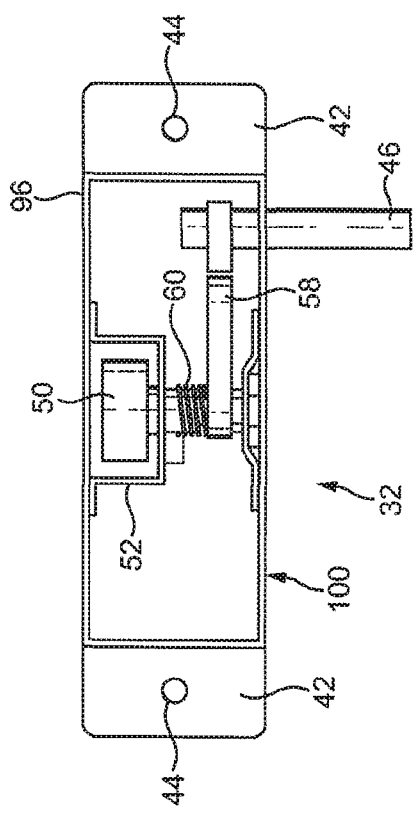

FIG. 18A
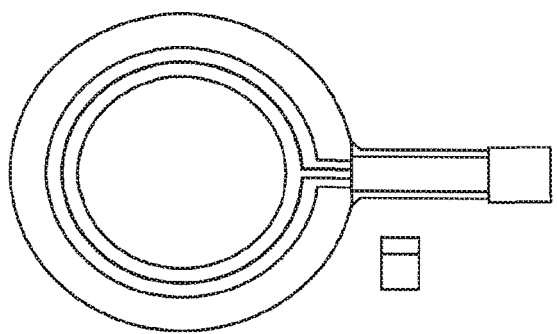
Magnetopot
FIG. 18B
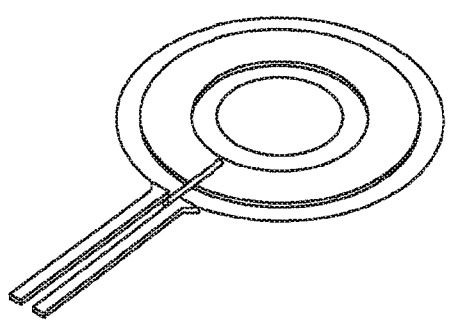
Softpot
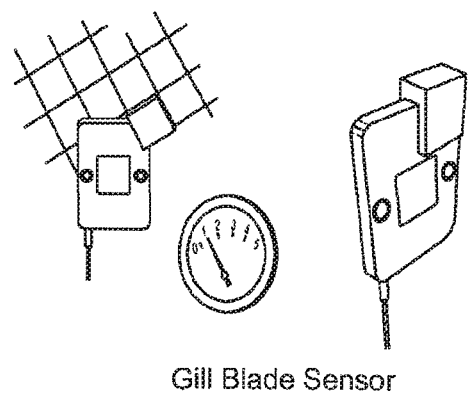
Gill Blade Sensor
FIG. 18C

SMOKE VENTILATION

The present invention relates to smoke ventilation, and in particular to pressurisation and depressurisation systems of buildings, which are designed to protect escape routes and fire-fighting stairs against smoke ingress when the building is on fire. The invention extends to sensors, and in particular to door and window sensors, which can be incorporated into such building pressurisation and depressurisation systems. The invention extends to building pressurisation and depressurisation systems incorporating such sensors, and to the uses of these systems in methods for protecting a building's escape routes against smoke ingress during a fire.

FIGS. 1 and 2 illustrate two different systems, which are designed to protect stairwell escape routes (4) and fire-fighting stairs (10, 26) in a building (3, 14) against the ingress of smoke during a fire (28). FIG. 1 shows a pressurisation system (1), and FIG. 2 shows a depressurisation system (2), each system achieving a similar goal, but in a different way. For example, the pressurisation system in the building (3) shown in FIG. 1, creates a positive pressure within the protected escape route (i.e. the stairwells, 4) when the building is on fire. This is achieved by blowing air into the escape route (4) by large ventilator fans (22), which may be located on the roof of the building (3). Thus, when the building is on fire, the air that is blown into the stairwell (4) maintains the air velocity across open doors maintaining a differential to the adjacent spaces, for example in the office and accommodation spaces (12). Furthermore, the resultant lower pressure that is created on the fire floor (28) ventilates the smoke on that floor, the result being that the smoke is prevented from entering the pressurized space (i.e. the stairwell), thereby protecting the escape routes (4). The British Standard currently requires the velocity of escaping gas/air/smoke across the face of a fire door (8) in a burning building (3) to be at least 2 $ms^{-1}$. This velocity is such that the pressure produced on the door is sufficient to prevent the ingress of smoke into the escape route during a fire, but, importantly, is not so great that an escaping occupant struggles to open the door.

In contrast to the pressurisation system shown in FIG. 1, the depressurisation system illustrated in FIG. 2 creates a negative pressure within the stairwell escape route (4) in order to dilute and extract smoke which may enter an escape route on the fire floor. It also induces sufficient air from an escape stairwell (4), which may be used by occupants escaping from other floors. The building (14) also includes ventilator fans (22) on the roof connected to a fan starter panel (24). When the building (14) is not on fire, the depressurisation system is in standby mode. However, when the building is on fire (28), the fire is detected by smoke detectors on the fire floor, which is then reported back to a control panel (24). A network of differential pressure sensors (16) provided on each floor controlled by the control panel (24) monitors the air pressure sends the pressure data to a programmable logic controller (PLC, 30), which controls the speed of the fans (22) to create a negative pressure (50 Pa) in the corridor or lobby when doors are closed (4). This negative pressure prevents the smoke ingressing into the stairwells. It should be noted that the direction of air in a depressurisation system flows in the same direction as in a building fitted with a pressurisation system, and the velocity of escaping gas/air across the face of a fire door (8) in a burning building (3) must again be at least 2 $ms^{-1}$.

Unfortunately, the use of pressurisation and depressurisation systems, as shown in FIGS. 1 and 2, is known to be difficult for controlling smoke ventilation when a building (3, 14) is on fire (28). In a fire scenario, a building behaves like a living body, "breathing" air in and out. Accordingly, ventilating smoke from the building (3, 14), and in particular the escape routes (4) and fire-fighting stairs (26), can be very difficult. The design, installation and commission of pressurisation and depressurisation systems is a notoriously difficult job for a fire engineer. To date, optimum results are achieved using pressure differential sensors, which detect the air pressure around the building, but there are various problems associated with using such sensors.

Firstly, pressure sensors are slow to detect the difference in pressure caused by the opening and closing of fire doors, as people escape, or the fire service tackle the fire. This delay in sensing the pressure (and changes in the pressure) can cause difficulty in commissioning the pressurisation or depressurisation system and can become dangerous in fire conditions. Secondly, as described in the paper entitled "Performance Assessment of pressurized stairs in high rise buildings" by C. Bellido, A. Quiroz & J. L Torero, page 9, when more than one fire door is opened, pressurisation and depressurisation systems struggle to maintain the pressure level in the staircase about the desired set-point (i.e. creating a velocity of escaping air across the face of a fire door of 2 $ms^{-1}$) and so pressures can widely fluctuate. As such, the use of pressure sensors in pressurisation and depressurisation systems is neither rapid nor safe.

There is therefore a need to provide improved pressurisation and depressurisation systems for protecting escape routes and fire-fighting shafts against smoke ingress when a building is on fire, which are fast, accurate and stable.

According to a first aspect of the invention, there is provided a building pressurisation or depressurisation apparatus for ventilating a building, the apparatus comprising sensing means for detecting the position of at least one door or window in the building, and control means for controlling the air leakage in an escape route of the building based on the position of the at least one door or window detected by the sensing means.

In a second aspect, there is provided use of the apparatus according to the first aspect, for ventilating a building, preferably ventilating smoke therein.

In a third aspect, there is provided a method of ventilating a building, the method comprising:
  (i) detecting the position of at least one door or window in the building, and
  (ii) controlling the air leakage in an escape route of the building based on the position of the at least one door or window detected in step (i).

Advantageously, the apparatus of the invention can be used for ventilating an escape route in the building to protect it against smoke ingress when the building is on fire. The inventors studied the use of air pressure sensors in prior art pressurisation and depressurisation systems, and realized that the air pressure in the stairwell depends, in part, on the fire doors/windows themselves, due to their variable leakage rate which is largely dependent upon the door/window positions. Accordingly, the inventors realized that it should be possible to control the degree of ventilation caused by a pressurisation or depressurisation system based on the position (or proximity) of a door or window in a stairwell, rather than on the air pressure, as measured by a pressure sensor, as is currently the case. To this end, a series of contact and non-contact door and window position sensors have been developed, which are highly responsive, fast and cost-effective compared to the use of pressure sensors, which are currently used in pressurisation and depressurisation systems.

In one embodiment, the sensing means may be a door position sensor. In another embodiment, the sensing means may be a window position sensor. The door or window, the position of which is detected by the sensing means, may be located where it can influence the ingress of smoke into the building's escape route during a fire. For example, the door or window may be located in an internal wall or partition of the building. Thus, the door or window may be an internal door or window. The door or window may be a hinged or sliding door or window. The door may be a fire door.

Preferably, the sensing means is capable of being attached to a door or window frame, preferably a door lintel. The sensing means may comprise one or more fixing means for attachment to the window frame or lintel. For example, the sensing means may be arranged to be secured to a lintel such that the mid-point of the sensing means is substantially aligned with hinges of the door or window. Advantageously, this alignment of the sensing means with the hinges ensures that any movement of the door or window can be easily and accurately detected. The sensing means is preferably arranged, in use, to detect a 180° swing of the door or window with respect to the frame, in embodiments where the door or window is hinged. In embodiments where the position of a sliding door or window is detected, however, the sensing means may be attached to the door frame, and aligned with the direction in which the door or window slides.

The sensing means may be capable of producing an output in the form of 0V-10V, or 4 mA to 20 mA. Advantageously, as shown in FIG. 3, the output of one embodiment of the sensing means is substantially linear with respect to the position of the door or window, which makes its use in the pressurisation or depressurisation apparatus both fast and accurate. The sensing means may rely upon contact with the door or window to determine is position with respect to its frame. Alternatively, the sensing means may not rely on contact with the door or window, and may be referred to as a non-contact sensor.

In a first embodiment, one example of which is described in Example 1, and shown in FIG. 5, the sensing means may be an angular displacement sensor, which is capable of sensing the position of the door or window to which it is fitted with respect to the corresponding door/window frame. The sensing means may comprise a potentiometer, which is capable of detecting an angular displacement of the door or window with respect to its frame. The sensing means may comprise a body, one end of the potentiometer being rigidly secured thereto, for example via a mounting bracket or the like, and an opposite end of the potentiometer being rotatably secured to the body, for example via a bearing. The bearing may be a ball bearing, or the like.

The sensing means may comprise an actuating arm, which is connected to the potentiometer, the actuating arm being arranged to be contacted by the door or window as it moves between an open and closed configuration with respect to its corresponding door or window frame. The sensing means may comprise biasing means adapted to bias the actuating arm to a rest position, which corresponds to the closed configuration of the door or window. The biasing means may be a spring, for example a torsion spring.

The body, and preferably a lower surface thereof, may comprise a slot along which the actuating arm may travel as it is urged away from the rest position, as the door or window is moved from the closed configuration to the open configuration. The slot may be elongate and substantially curved, thereby delineating the circumference of a semi-circle.

In use, the sensing means may be attached to a door or window frame or lintel such that, as the door or window is opened, it contacts the actuating arm, and urges the arm away from the door or window frame, the potentiometer detecting this angular displacement. In use, as the actuating arm moves along the slot, against the biasing force created by the biasing means, the potentiometer being adapted to detect the position of the actuating arm, and convert this position into a voltage signal. The sensing means may comprise means for transmitting the voltage signal to the control means of the pressurisation apparatus or depressurisation apparatus, for controlling the air leakage in an escape route of the building.

In a second embodiment, the sensing means may comprise an optical sensor, one example of which is described in Example 2, and shown in FIG. 16. The sensing means may comprise a light emitter adapted to emit light towards the door or window, and a light detector for detecting light that is reflected back off the door or window. The light may be visible light, infrared (IR) or light generated by a laser. In a preferred embodiment, however, the light may be infrared light. For example, the wavelength of IR emitted may be about $\lambda=870\pm70$ nm. The light emitter and/or light detector may comprise a lens, which may be protected by an optical cover, which allows efficient transmittance of the light therethrough.

The sensing means may be adapted, in use, to determine the position of the door or window by calculating the time it takes for the light to reflect back off the door or window onto the detector. The sensing means may comprise means for converting this position into a voltage signal. The sensing means may comprise means for transmitting the voltage signal to the control means of the apparatus, for controlling the air leakage in an escape route of the building.

In other embodiments, the sensing means may comprise a Gill Blade sensor, a Magnetopot sensor, a Softpot sensor, a rotary encoder sensor or a laser sensor.

The control means is adapted to control the air leakage in the escape route of the building based on the position of the at least one door or window detected by the sensing means. It will be appreciated that by controlling the air leakage in the escape route, the velocity of air is also influenced, which in turn will influence the air pressure within the escape route.

Thus, the pressurisation apparatus or depressurisation apparatus may comprise means for creating a pressure differential in the escape route of the building. For example, the pressure differential may be either a positive or negative pressure in the escape route. Thus, the building pressurisation apparatus may be adapted to create a positive pressure in the escape route, and the building depressurisation apparatus may be adapted to create a negative pressure in the escape route. The pressure differential may be created by one or more ventilator fan. The escape route may be a stairwell, lobby or corridor of the building, or fire-fighting stairs.

The control means may further comprise a programmable logic controller, which is adapted, in use, to receive data relating to the position of the at least one door or window, and trigger the means for creating a pressure differential in the escape route of the building. The apparatus may comprise an inverter for controlling the speed of the means (i.e. fan) for creating a pressure differential in the escape route of the building. The apparatus is preferably adapted to control the velocity of escaping gas/air/smoke across the face of the door or window in a burning building so that it is at least 2 ms$^{-1}$, on fire and ground floor doors.

The inventors believe that they are the first to have developed a door or window position sensor, which can be used for detecting the position of a door or window with respect to its corresponding door/window frame.

Thus, in a fourth aspect, there is provided a door or window position sensor for detecting the position of a door or window with respect to its corresponding door/window frame, the sensor comprising a potentiometer, which is capable of detecting angular displacement of the door or window with respect to its frame.

The sensor may incorporate the features of sensing means defined in the first aspect. The sensor may comprise a body, one end of the potentiometer being rigidly secured thereto, for example via a mounting bracket or the like, and an opposite end of the potentiometer being rotatably secured to the body, for example via a bearing. The sensor may comprise an actuating arm, which is connected to the potentiometer, the actuating arm being arranged to be contacted by the door or window as it moves between an open and closed configuration with respect to its corresponding door or window frame. The sensor may comprise biasing means adapted to bias the actuating arm towards a rest position, which corresponds to the closed configuration of the door or window. The biasing means may be a spring, for example a torsion spring. It will be appreciated that the sensor of the fourth aspect may be described as being a contact sensor.

In a fifth aspect, there is provided a door or window position sensor for detecting the position of a door or window with respect to its corresponding door/window frame, the sensor comprising a light emitter adapted to emit light towards the door or window, and a light detector for detecting light that is reflected back off the door or window, wherein, the sensor is adapted, in use, to determine the position of the door or window by calculating the time it takes for the light to reflect back off the door or window onto the detector.

The light may be visible light, infrared (IR) or light generated by a laser. Preferably, the light is infrared light. The wavelength of IR emitted may be about $\lambda=870\pm70$ nm. The light emitter and/or light detector may comprise a lens, which may be protected by an optical cover, which allows efficient transmittance of the light therethrough. The sensor may comprise means for converting the position of the door or window into a voltage signal, which signal may be used to trigger a controller. It will be appreciated that the sensor of the fifth aspect may be described as being a non-contact sensor. The sensor may be used to detect the position of a hinged or sliding door or window.

In a sixth aspect, there is provided a building pressurisation or depressurisation apparatus for ventilating a building, the apparatus comprising the sensor according to either the fourth or fifth aspect.

All of the features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying diagrammatic drawings, in which:

FIG. 6a shows a cross-sectional plan view from underneath the first embodiment of the door sensor, FIG. 6b shows a cross-sectional plan view of the door sensor from above, FIG. 6c shows a cross-sectional view of the front of the sensor, and FIG. 6d shows a plan view of a lid of the sensor;

Figure 8:
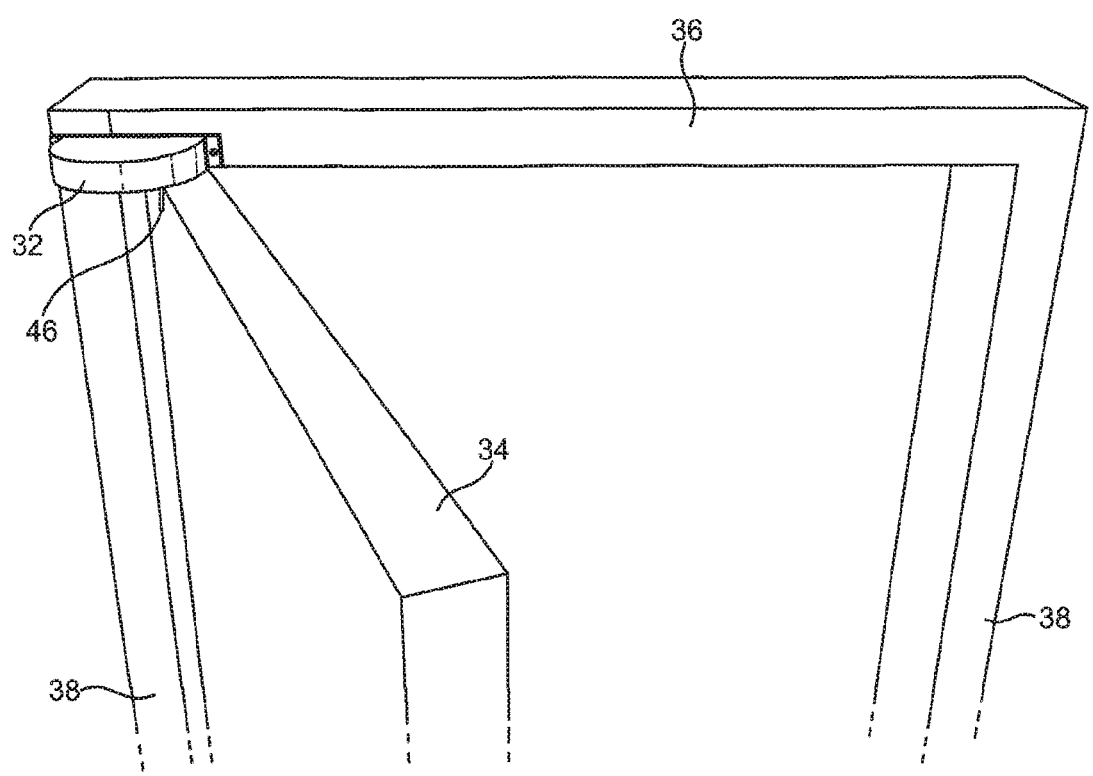
Figure 9:
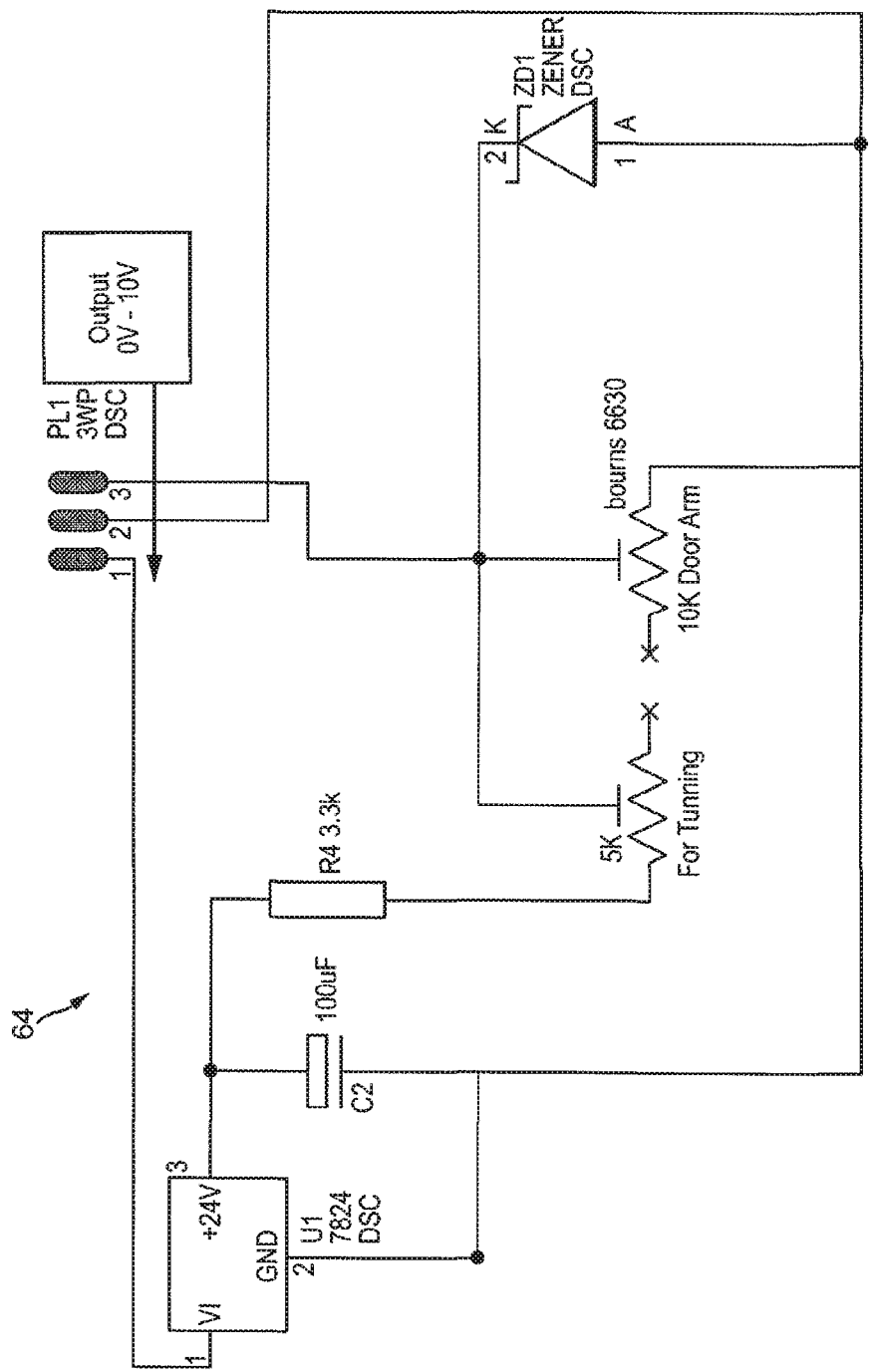
Figure 10:
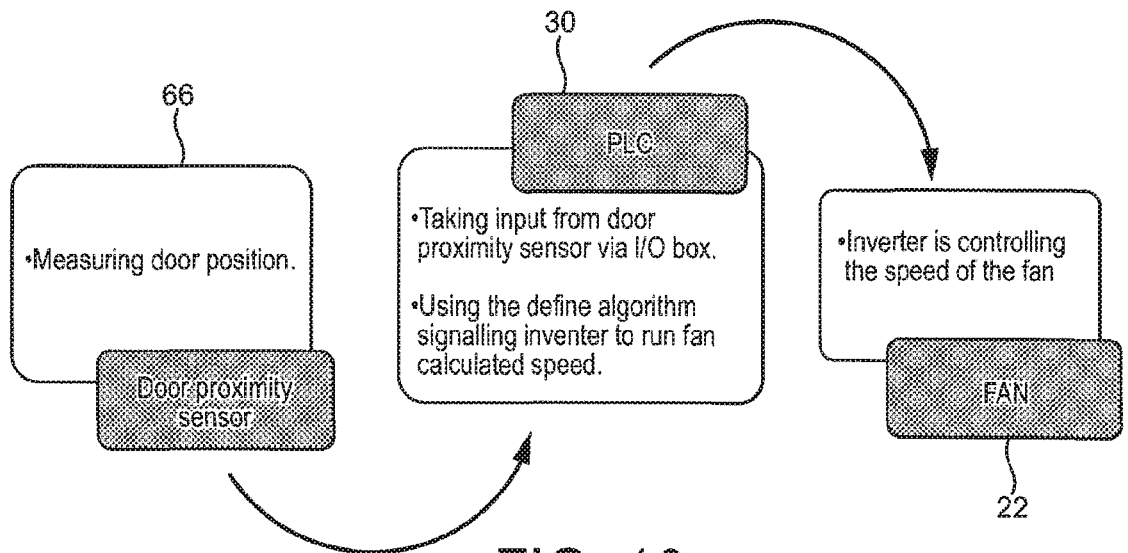
Figure 11:
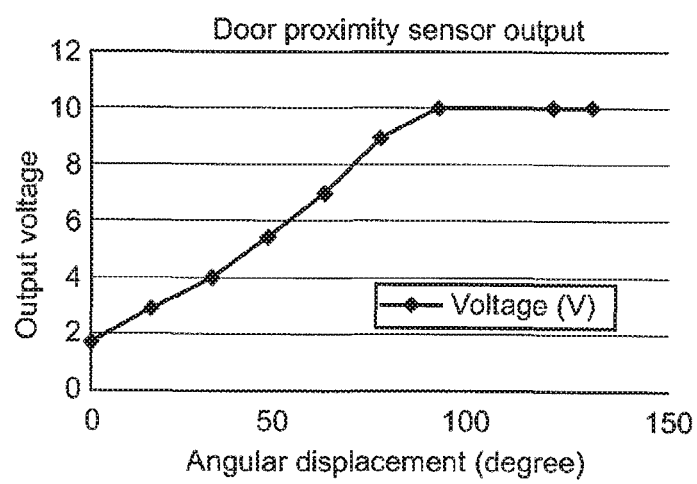
Figure 12:
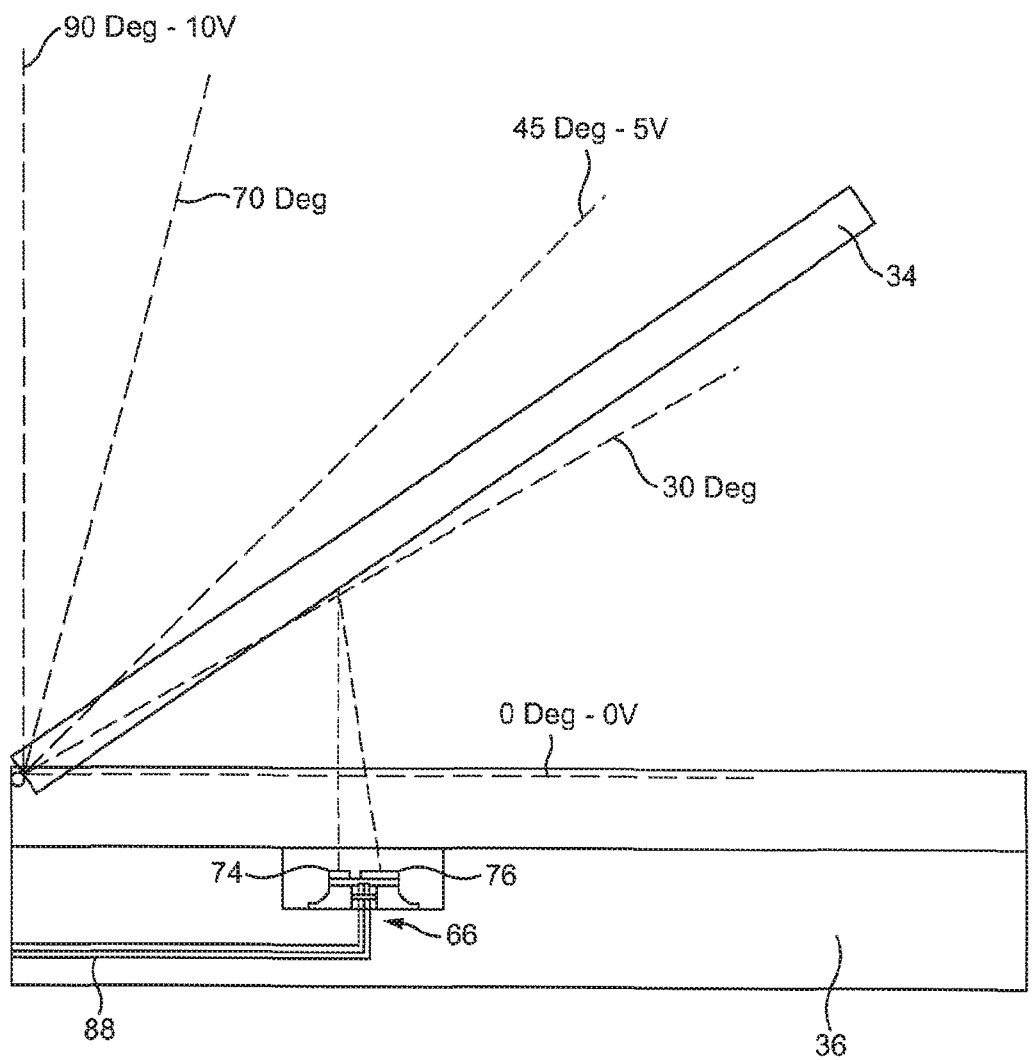
Figure 13:
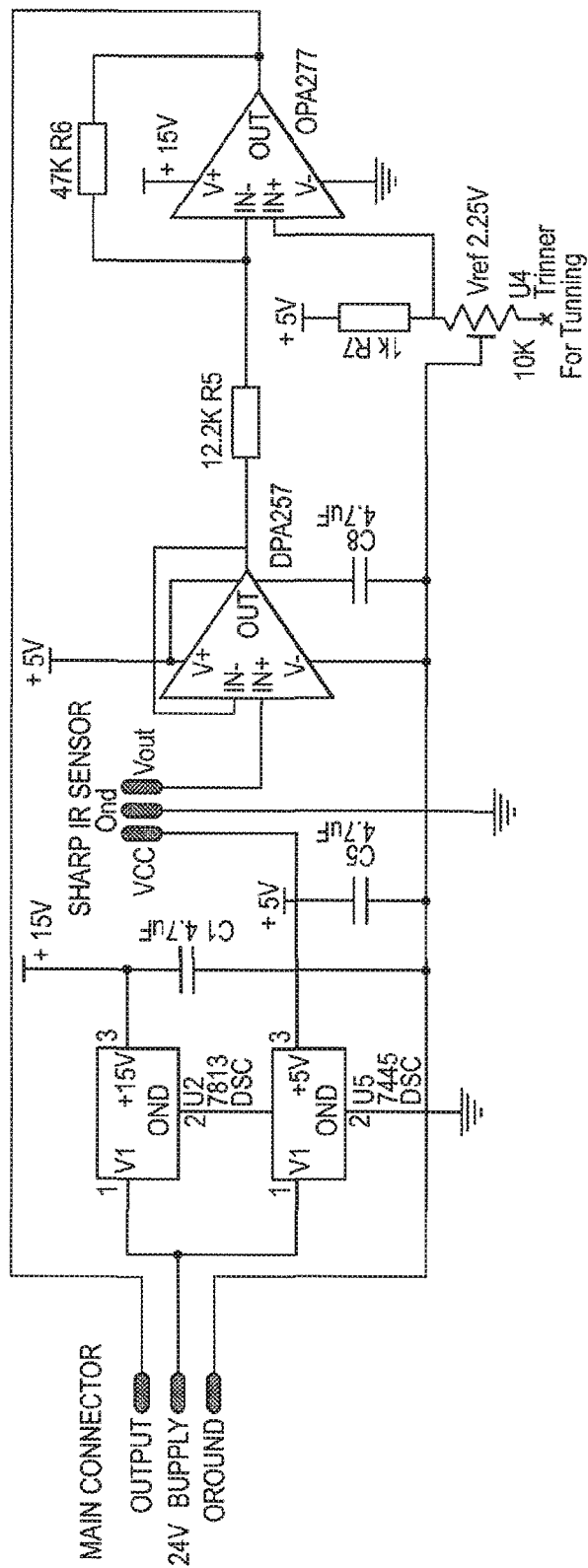
Figure 14B:
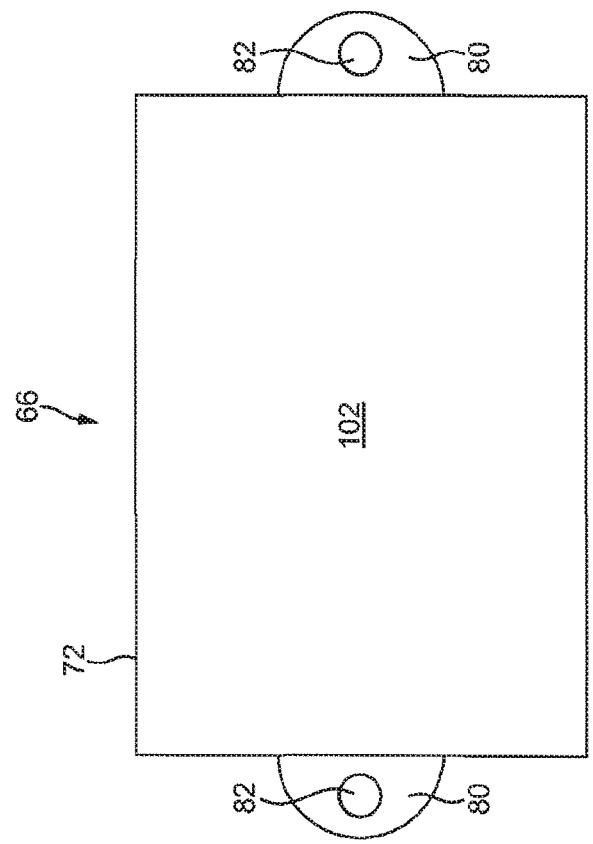
Figure 14A:
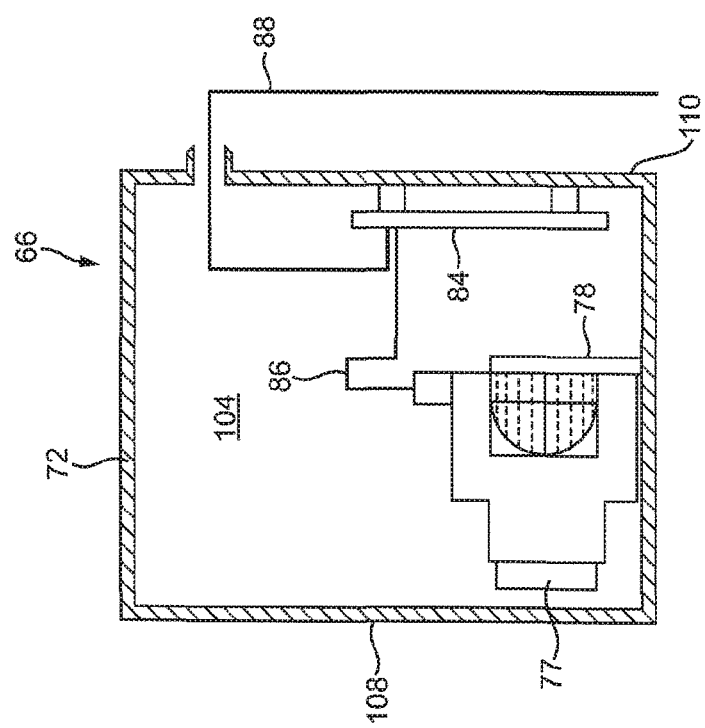
Figure 15A:
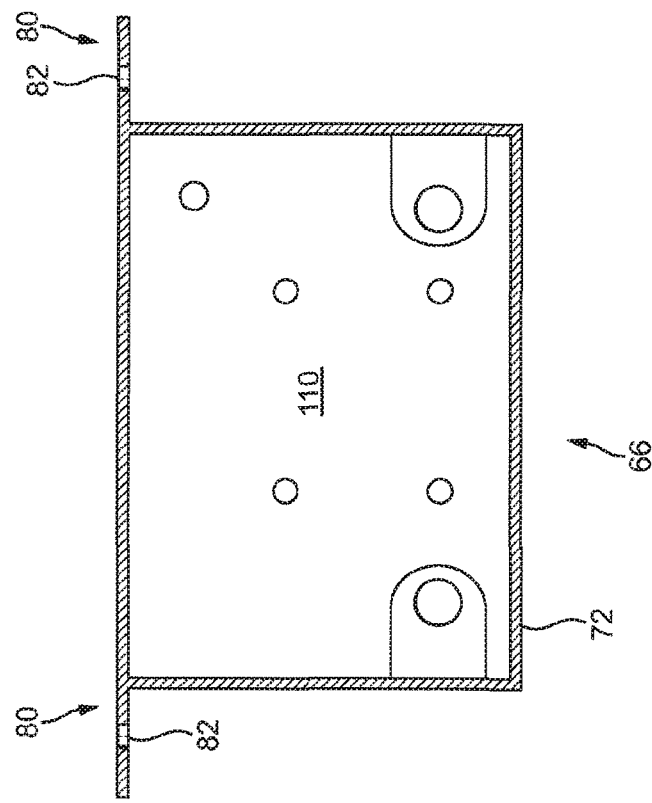
Figure 15B:
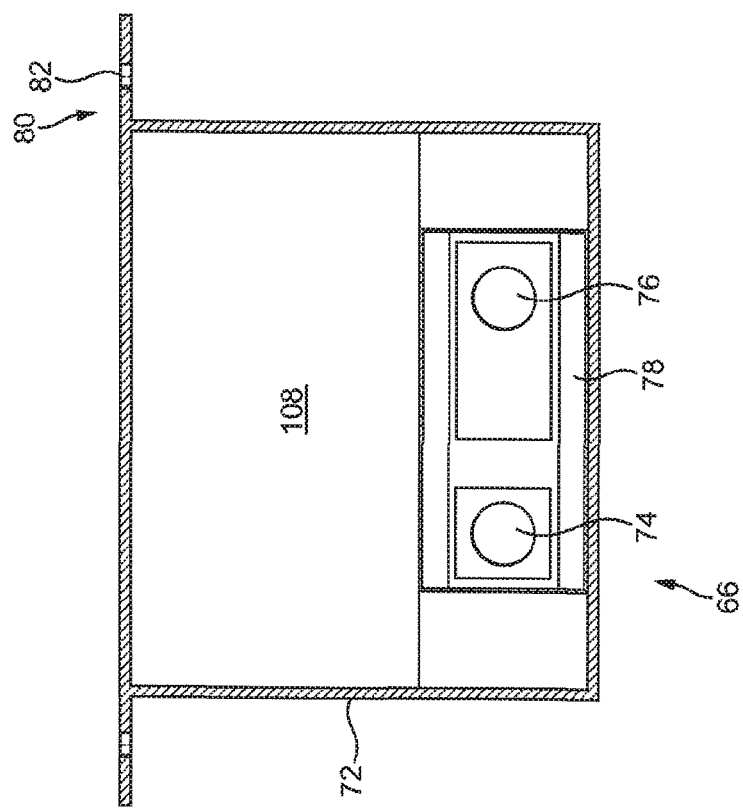
Figure 16:
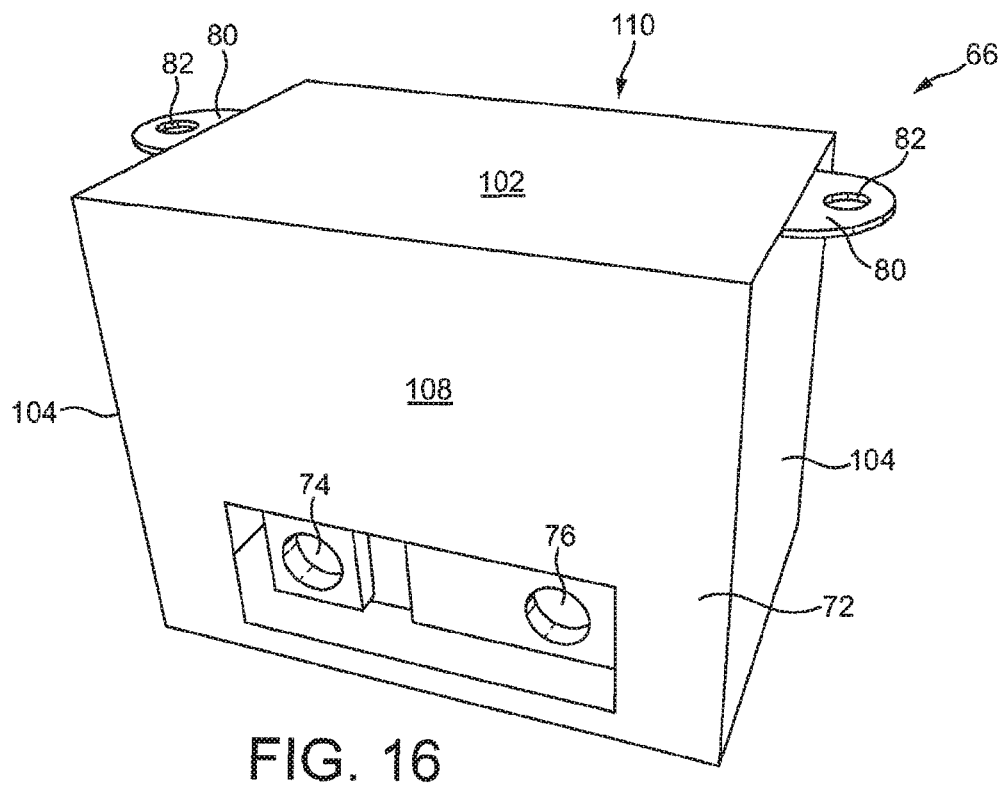
Figure 17:
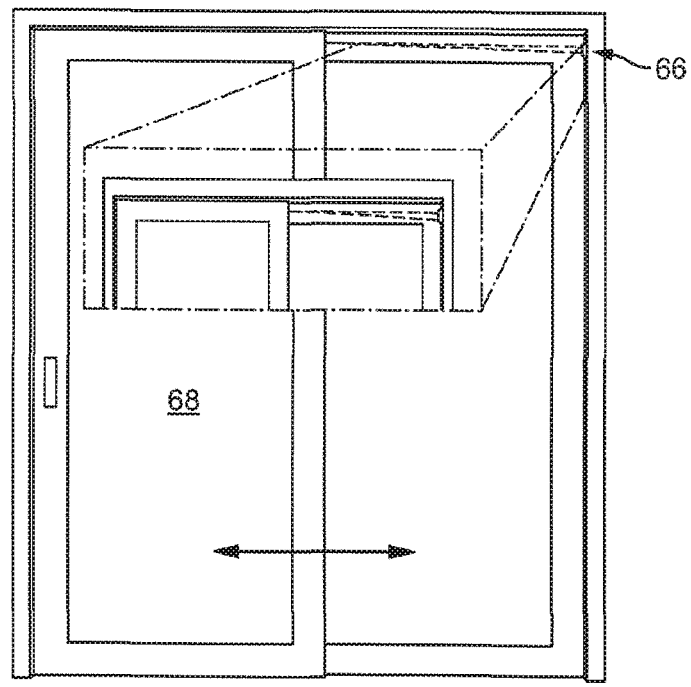

FIG. 7 shows enlarged views of the various components constituting the inner assembly of the first embodiment of the door sensor. FIG. 7a is a side view of a potentiometer used in the sensor, FIG. 7b is a plan view of a sensor arm, FIG. 7c is a plan view of a mounting bracket, and FIG. 7d is a front view of the mounting bracket. FIG. 7e is a plan view of a support bracket for the potentiometer (in an unfolded configuration), FIG. 7f is a plan view of the support bracket (in a folded configuration) and a side view of a ball bearing, and FIG. 7g is a side view of the support bracket;

FIG. 8 is an enlarged perspective view of the first embodiment of the door sensor in position attached to the lintel of a fire door;

FIG. 9 is a circuit diagram for the first embodiment of the door sensor;

FIG. 10 is a flow diagram for a second embodiment of a pressurisation or depressurisation apparatus according to the invention;

FIG. 11 is a graph showing the relationship between the output voltage and door angular displacement using a second embodiment of the door sensor of the invention;

FIG. 12 is a schematic plan view of the second embodiment of the door sensor attached to the lintel of a fire door. The Figure indicates the position of the door at 0°, 30°, 45°, 70° and 90° with respect to the door frame;

FIG. 13 is a circuit diagram for the second embodiment of the door sensor;

FIG. 14a is schematic cross-sectional side view of the second embodiment of the door sensor, and FIG. 14b is a top view of the sensor;

FIG. 15a is a schematic view of the front of the second embodiment of the door sensor, and FIG. 15b is a view of the rear of the sensor;

FIG. 16 is a perspective view of the second embodiment of the door sensor;

FIG. 17 is a front view of a sliding door arrangement with the second embodiment of the sensor attached to the door jam; and FIG. 18a shows a Magnetopot door sensor, FIG. 18b shows a Softpot door sensor, and FIG. 18c shows a Gill Blade sensor.

EXAMPLES

Figure 1:
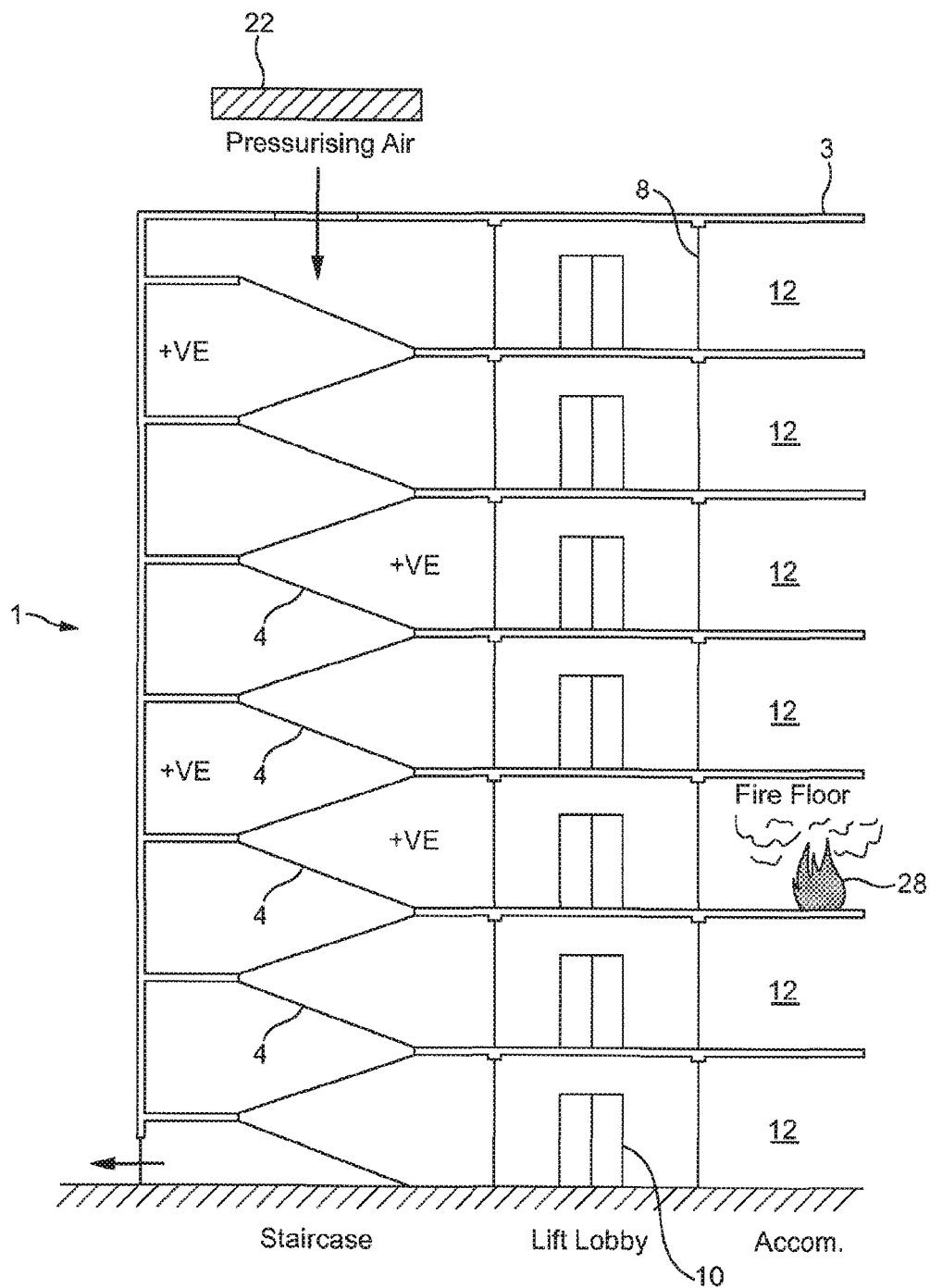
FIG. 1 is a schematic side view of a pressurisation system for a building.
Figure 2:
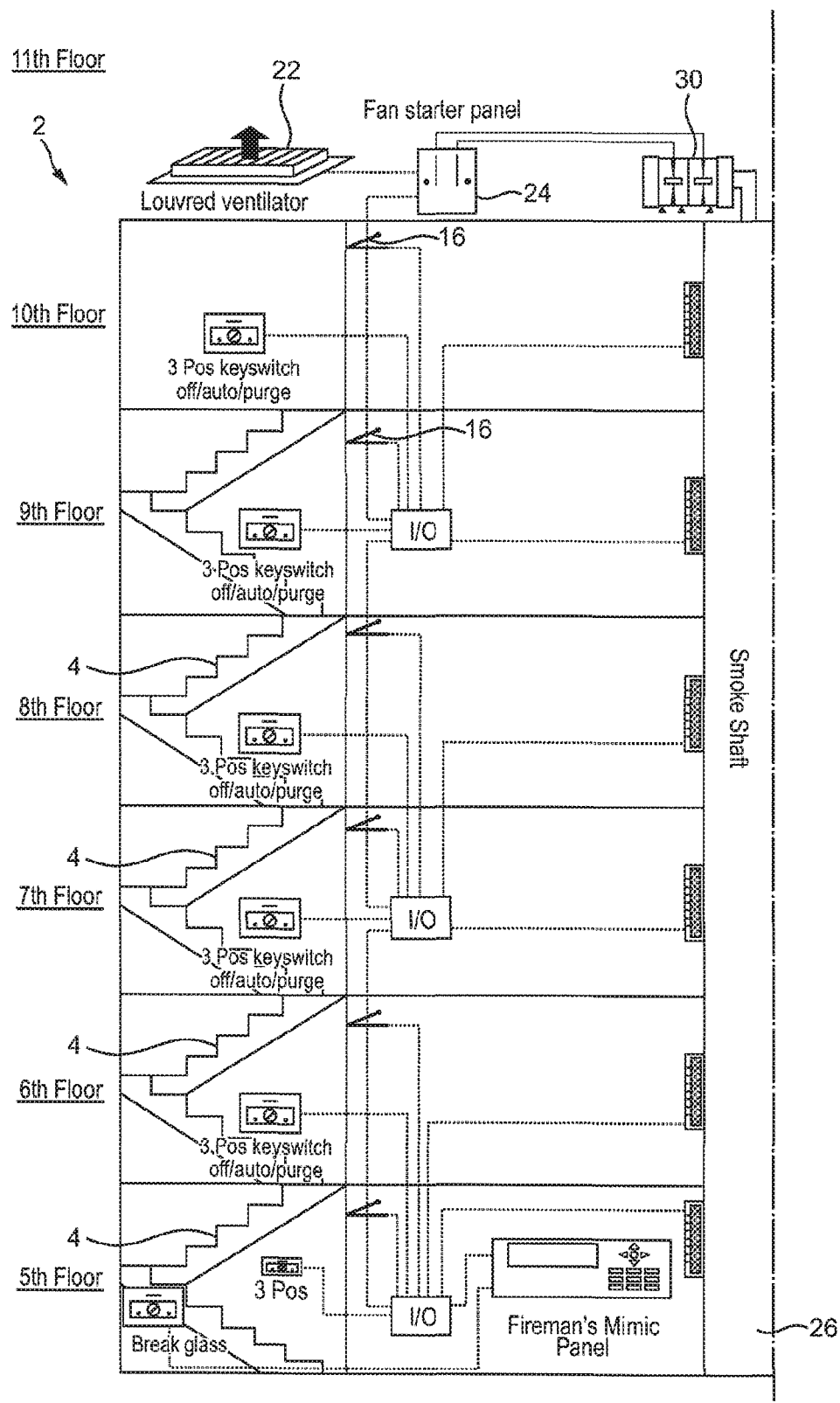
FIG. 2 is a schematic side view of a depressurisation system for a building.
Figure 2:
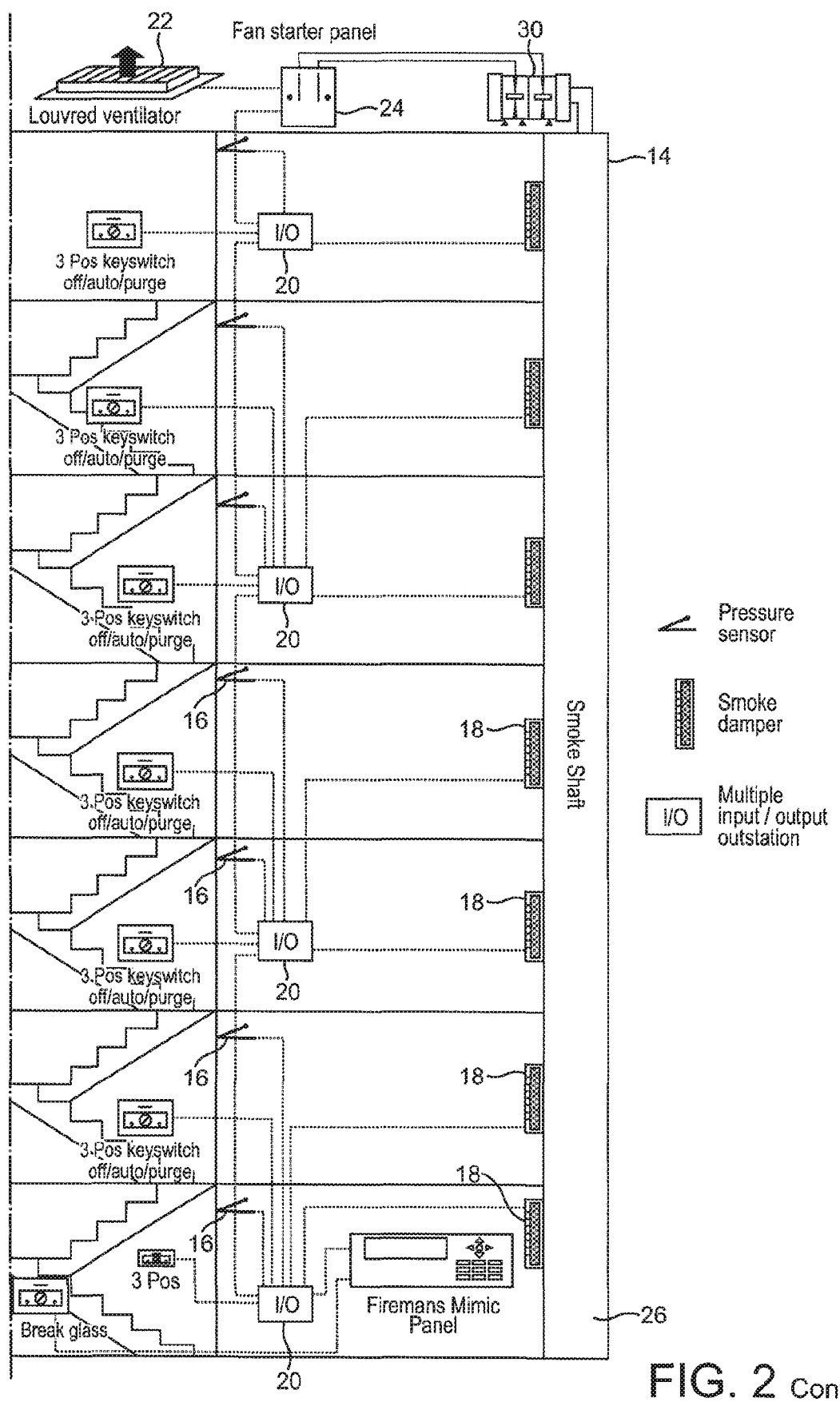

The inventors realised the problems inherent with pressurisation and depressurisation systems which incorporate differential pressure sensors 16 for monitoring and triggering the ventilator fans 22, and have developed several embodiments of a door position (i.e. proximity) sensor, which can be incorporated into the pressurisation system 1 shown in FIG. 1, or the depressurisation system 2 shown in FIG. 2. It should be appreciated that the pressurisation and depressurisation systems 1, 2 of the invention, are very similar to the two systems shown in FIGS. 1 and 2, but that a door position sensor of the invention, as described in detail below, is used instead of a prior art pressure sensor 16. Each embodiment of the door position sensor of the invention produces an output in the form of 0V to 10 V or 4 mA to 20 mA, which enables it to be compatible with any industrial or commercial controller. The following examples describe each embodiment of the door position sensor and how it is incorporated into a pressurisation system 1 or depressurisation system 2 shown in FIGS. 1 and 2, respectively.

Example 1—Potentiometer-based Door Proximity Sensor (DPS 1)

Figure 3:
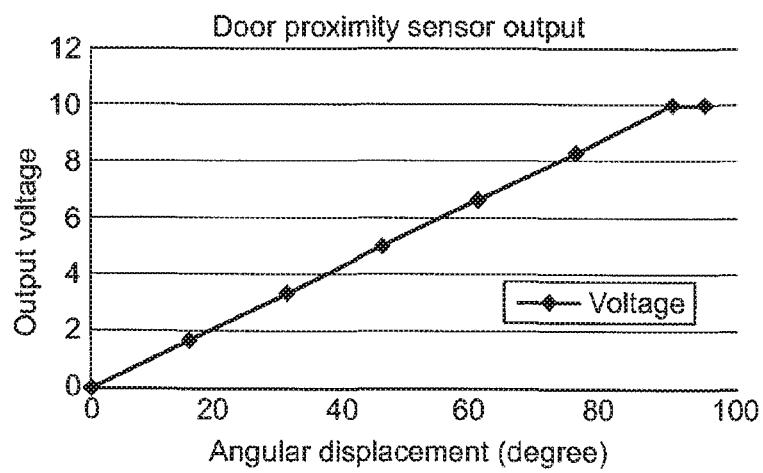
FIG. 3 is a graph showing the linear relationship between the output voltage and door angular displacement using a first embodiment of the door position sensor of the invention.
Figure 5:
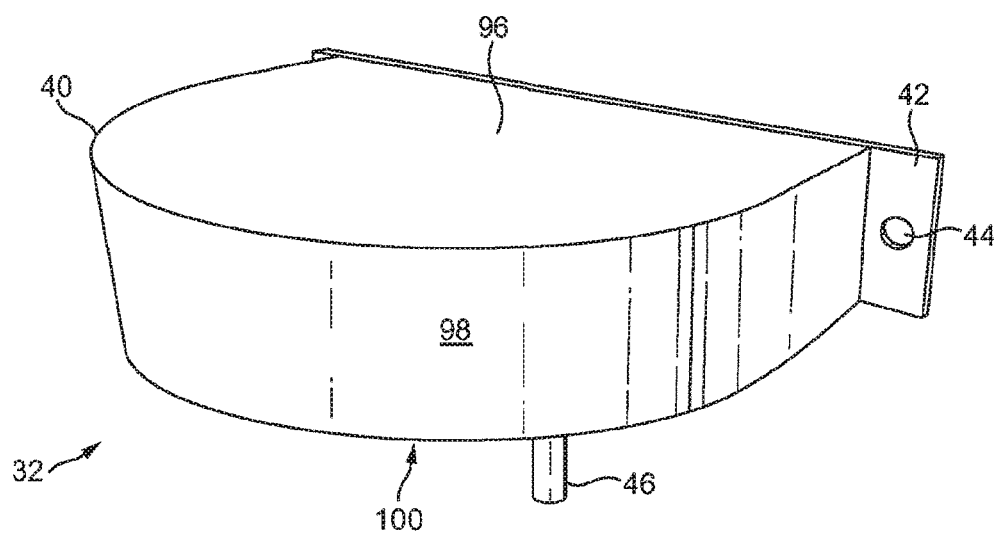
FIG. 5 shows a perspective view of the first embodiment of the door position sensor.

The first embodiment of door position sensor is a potentiometer-based door sensor 32, and is shown in FIG. 5. The sensor 32 is an angular displacement sensor and senses the position of a door 34 to which it is fitted with respect to the corresponding door frame 38 or lintel 36, as shown in FIG. 8. The sensor 32 produces an output in the form of 0V-10V or 4 mA to 20 mA, as desired. As shown in FIG. 3, the output of the sensor 32 is linear with respect to the position of the door 34, which makes its use for controlling a pressurisation system 1 or depressurisation system 2, both fast and accurate.

Figure 4:
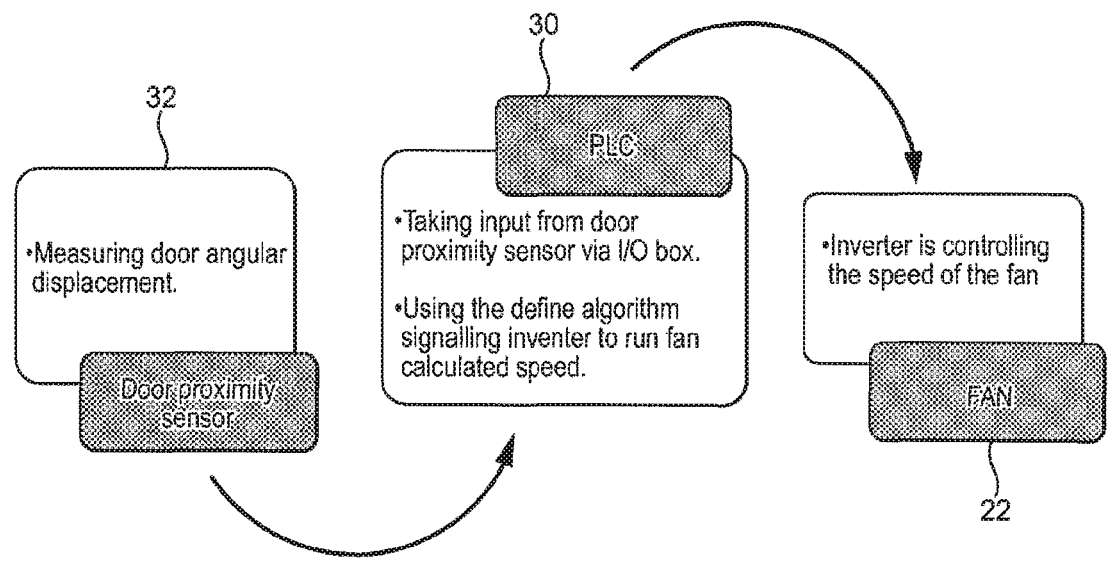
FIG. 4 is a flow diagram for a first embodiment of a pressurisation or depressurisation apparatus according to the invention.

FIG. 4 shows a flow diagram for a first embodiment of a pressurisation system 1 or depressurisation system 2 of the invention incorporating sensor 32. When the building 3, 14 is not on fire, the pressurisation system 1 or depressurisation system 2 is in standby mode, and the fans 22 on the roof of the building are switched off. However, as soon as a fire is detected in the building 3, 14, the system 1, 2 is switched on, and the sensors 32 are initiated to detect the position of the doors 34 to which they are attached. When a door 34 is closed (i.e. 0° with respect to the corresponding door frame 38 or lintel 36), the sensor 32 signals 0V to the programmable logic controller (PLC, 30), and so the ventilator fan 22 remains switched off. However, as soon as the door 34 is opened, and an angle is created between the door and the door frame 38 or lintel 36, the output voltage will increase linearly, as shown in FIG. 3, causing the ventilator fans 22 to be switched on, thereby creating either a positive pressure in the stairwells 4 of the pressurisation system 1, or a negative pressure in stairwells 4 of the depressurisation system 2. An algorithm signals an inverter to run the fans 22 at the calculated speed, such that the velocity of air flowing passed the fire door 34 is fixed about a set-point of at least 2 m/s. The output voltage increases linearly as the door 34 is opened still further until the door 34 reaches a 90° angle with respect to the door frame 38 or lintel 36, at which point the sensor 32 outputs a maximum of 10V. At angles beyond 90°, the output from the sensor 32 will be clamped at 10V as shown in FIG. 3, because the velocity of the air remains the same across the face of the door 34 beyond 90° with respect to the door frame 38 or lintel 36.

Sensor Design and Construction (DPS 1)

The sensor 32 is shown most clearly in FIG. 5, and has an outer housing 40 made of rigid stainless steel. The housing 40 has an upper surface or top 96 and a lower surface or base 100, which are inter-connected by a curved sidewall 98. The housing 40 is provided with two flanges 42 on either side thereof, each flange 42 having a centrally aligned aperture 44 through which a screw (not shown) may be passed to secure the sensor 32 to a back plate 47 and door frame 38, and in particular the upper lintel 36 of the door 34. An actuating arm 46, which is provided to detect the angular displacement of the door 34 with respect to the door frame 38 or lintel 36, extends outwardly from the base 100 of the housing 40.

As shown in FIG. 8, the sensor 32 is attached to the door lintel 36 such that, as the door 34 is opened, it contacts the actuating arm 46, and urges the arm 46 away from the door frame 38. The housing 40 of the sensor 32 is designed in such a manner so as to withstand the daily wear and tear to which it will be subjected. The sensor 32 is designed to cover a 180° swing of the door 34, and in order for the sensor 32 to function correctly, it is fixed to the lintel 36 such that the mid-point of the sensor 32 is is aligned with door hinges (not shown). This ensures that movement of the door 34 is easily and accurately sensed by the sensor 32. The sensor 32 has been carefully designed so that it is compact and does not adversely affect the appearance and/or finish of the building in which it is used. Since the pressurisation system 1 or depressurisation system 2 incorporating the sensor 32 is dependant upon the reliability and performance of the sensor 32, it will be subject to a regular maintenance regime every twelve months.

FIGS. 6 and 7 show the various internal components of the sensor 32. FIGS. 6a and 6b show views of the housing 40 from above and below, respectively, and FIG. 6c shows an internal view of the housing 40 from the rear. FIG. 6d shows a plan view of a back plate 47 for the housing 40, the back plate 47 having apertures 49 towards each end thereof. The back plate 47 is secured to the rear of the housing 40 by means of screws (not shown) which are passed through apertures 49 in the back plate 47 and apertures 44 in the flanges 42 of the housing 40.

Figure 7A:
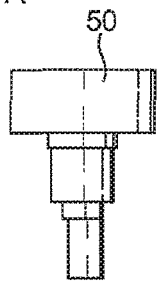
Figure 7B:
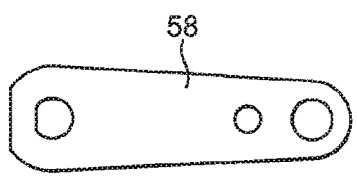
Figure 7E:
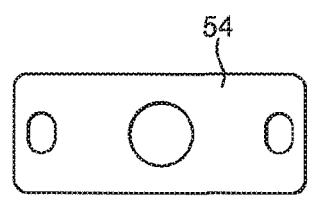
Figure 7C:
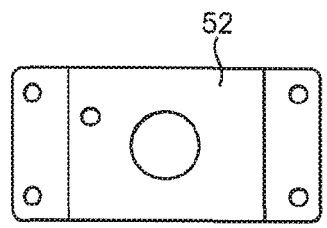
Figure 7F:
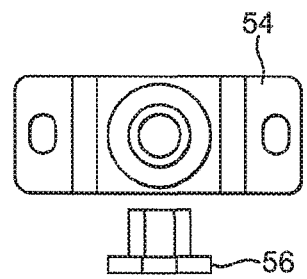
Figure 7D:
Figure 7G:

As shown in FIG. 6c, the sensor 32 includes a potentiometer 50, one end of which is secured to the inside of the upper surface 96 of the housing 40 by a mounting bracket 52. Detailed illustrations of the potentiometer 50 and mounting bracket 52 are shown in FIGS. 7a, 7c and 7d, respectively. The opposite end of the potentiometer 50 is inserted into a ball bearing 56, which is supported by a support bracket 54, which is secured to the inside of the base 100 of the sensor housing 40. Detailed illustrations of the ball bearing 56 and the support bracket 54 are shown in FIGS. 7e-g. The actuating arm 46 is connected to the potentiometer 50 by a sensor arm 58, which is shown in FIG. 7b, and a torsion spring 60 is attached to the sensor arm 58 to bias the sensing arm 58 and the actuating arm 46 to a rest position, when the door 34 is in the closed configuration.

The lower surface of the housing 40 is provided with an elongate curved slot 48, which delineates the circumference of a semi-circle. The actuating arm 46 travels along the curved slot 48, as it is urged away from its rest position, as the door 34 is moved from a closed configuration to open configuration. With reference to FIG. 6c, the actuating arm 46 would be urged out of the page, as the door 34 opened. As the actuating arm 46 moves around the curved slot 48, against the biasing force creating by the spring 60, the potentiometer 50 detects its position, and converts this position into a voltage signal. The potentiometer 50 is connected to a printed circuit board (PCB) 62, which transmits the voltage signal to the PLC 30, which causes the ventilator fan 22 of the pressurisation system 1 or depressurisation system to be activated.

Sensor Circuit (DPS 1)

FIG. 9 shows a schematic diagram of the circuit 64 for sensor 32. The sensor 32 uses a voltage divider to convert angular displacement into voltages, and has a variable trimmer resistor which can be used for tuning purposes.

Example 2—Optical Sensor-based Door Proximity Sensor (DPS 2)

Referring FIG. 16, the second embodiment of sensor used in the pressurisation system 1 or depressurisation system 2 of the invention is an optical sensor 66, which has been developed for applications where it is important that the appearance and finish of the building is not compromised. The optical sensor 66 is small and compact in size, and works on the principle of reflection of a wavelength (e.g. IR or laser). As shown in FIG. 12, the sensor 66 can be attached to the lintel 36 of a hinged door 34, as with the first embodiment of sensor 32. However, in addition to hinged doors 34, many modern offices and residential buildings have sliding doors 68 to make the most of the available space, as shown in FIG. 17. The optical sensor 66 can be easily fitted to detect the position of any type of sliding door 68, as well as hinged doors 34.

The optical sensor 66 senses the position of the door 34, 68 and produces an output in the form of 0-10V or 4 to 20 mA. In one embodiment, it emits infrared (IR) light onto the door 34, 68, and determines its position by calculating the time it takes for the IR light to reflect back onto the sensor 66. As shown in FIG. 11, at low angular displacement values with respect to the door frame 38 or lintel 36 (i.e. when the door is closed or nearly closed), the sensor's output is non-linear, but it becomes more linear at higher angular displacements (i.e. when the door 34 is open wider). Due to this non-linearity at low angles, the control system 30 has to be programmed accordingly to operate the system reliably.

Referring to FIG. 12, when the door 34 is closed (i.e. at a 0° displacement with respect to the door frame 38 or lintel 36), it will produce an output signal of 1.8V, which is sent to the PLC 30, which causes the ventilator fans 22 to be triggered to run at a lower rate. However, as the door 34 starts is opened, the voltage increases, thereby triggering the fans 22 to be switched on or run at a higher rate. The voltage increases further as the door 34 is opened still further, until the door 34 reaches an angle of 90°, at which point the sensor 66 produces an output voltage of 10V. At angles beyond 90°, the output voltage is clamped to 10 V, as shown in FIG. 11. As with the first embodiment of sensor 32, the voltage is also clamped to boy for the second embodiment of sensor 66, because the velocity of the air remains substantially constant across the face of the door 34 beyond a 90° displacement.

Sensor Design and Construction (DPS 2)

Referring to FIG. 14a, since the sensor 66 will be subjected to daily wear and tear as well as some extreme conditions, it is provided with an outer housing 72 made of stainless steel. The housing 72 has an upper surface or top 102, side walls 104, a lower surface or base 106, a front wall 108 and a rear wall 110. The housing 72 is provided with two flanges 80 which extend outwards from upper regions of two mutually opposing side walls 104. Each flange 80 has an aperture 82 through which a screw (not shown) may be passed to secure the sensor 66 to a door frame, in particular the lintel 36 thereof.

The sensor 66 includes an infrared LED emitter 74 and an infrared detector 76 (both obtained from Sharp), both of which are secured to the base 106 of the housing 72 by a support bracket 78. The IR emitter 74 is adapted to emit IR radiation towards the door 34, 68, and the IR detector 76 is arranged to detect the IR waves that are reflected back off the door 34, 68. The IR emitter 74 and detector 76 each have a lens 77, which is protected by an optical cover (not shown), which allows efficient IR transmittance therethrough. For example, the wavelength of IR emitted by the LED emitter is $\lambda=870\pm70$ nm. Both faces of the optical cover are mirror-polished. The IR detector 76 is electrically connected, via wiring 86, to a printed circuit board (PCB) card which is attached to the 84 via wiring 86, and the output signal that is generated is connected to the PLC 30 via electric cabling 88.

Sensor Circuit (DPS 2)

In order to work with any industrial controller, an infrared detector 76 which generates 0V to 2.5V outputs is used. Referring to FIG. 13, there is shown a circuit diagram 70 used for the optical sensor 66, which was specially designed to convert the output from the IR detector 76 into an analogue output of 0V to 10V. The DPS2 circuit 70 has two stages. The first stage includes an operational amplifier (OPA350) being connected in a unity configuration with the high impedance output created by the IR detector 76. This is one of the ways to connect an operational amplifier to provide unity gain. In the second stage, an operational amplifier OPA277 is used to convert the voltages into the correct voltage range of 0V-10 V.

Sensor (DPS2) and Sliding Doors

Referring to FIG. 17, in modern offices and residential buildings, sliding doors 68 are becoming more frequently used, in order to make most of the available space. Advantageously, the sensor 66 can be easily fitted to sense the position of any type of sliding door 68.

Example 3—Other Sensor Types

The inventors have also incorporated other types of door proximity sensor into embodiments of the pressurisation system 1 and depressurisation system 2 of the invention. For example, the sensors which have been used include the MagnetoPot 90, SoftPot, Gill Blade Sensor, Rotary Encoder and Laser sensor. It was shown that they all had good resolution and were very reliable. Magnetopot uses the magnetic field with its wiper movement on a magnetic track varying the resistance, whereas SoftPot uses force and position of the wiper to vary the resistance.

Softpot 10K by Spectra Symbol, Datasheet URL:http://docs-europe.electrocomponents.com/webdocs/oe31/0900766b8oe31a61.pdf Magnetopot 10K by Spectra Symbol, Datasheet URL: http://docs-europe.electrocomponents.com/webdocs/oe31/0900766b8oe31a55.pdf 25 mm Blade Sensor by Gill Sensors, Datasheet URL: http://www.gillsensors.co.uk/content/datasheets/25mm.pdf Retro reflective laser 15 m, P-wired, PNP Datasheet URL:http://docs-europe.electrocomponents.com/webdocs/oe99/0900766b8oe99453.pdf

CONCLUSIONS

The door proximity sensors 32, 66 described herein are a new beginning in the field of fire engineering and smoke ventilation. Smoke ventilation by pressurisation and depressurisation techniques using air pressure sensors have been classified as expensive and difficult, but by the introduction of the door position sensors 32, 66 of the invention, the prevention of smoke ingress into building escape routes by a pressurisation system 1 or a depressurisation system 2 will help to reduce cost, significantly improve the performance and be much easier to commission. They will enable real-time control of airflow and eliminate over-pressure on doorways, having a very rapid reaction time. It will be appreciated that the position sensors 32, 66 of the invention do not necessarily need to be used to detect the position of a door 34, 68, and can also be used with windows. The windows can be located on internal walls or partitions of the building, their position also influencing ingress of smoke into escape routes.

The invention claimed is:

1. An apparatus for ventilating an escape route of a building, the apparatus comprising sensing means for detecting positions of a plurality of doors in the escape route of the building, and control means, coupled to a ventilator fan, for variably controlling a velocity of air leakage in the escape route of the building, using the ventilator fan, to be at least 2 ms$^{-1}$ based on the positions of the plurality of doors detected by the sensing means to maintain pressure in the escape route at a level sufficient to prevent ingress of smoke into the escape route from outside of the escape route when one or more of the plurality of doors are opened,
wherein the plurality of doors comprise sliding doors,
wherein the sensing means comprises a plurality of sensors, each respectively attached to a corresponding one of the plurality of doors, wherein each sensor is capable of sensing the position of the corresponding one of the plurality of doors to which it is fitted with respect to a corresponding one of a plurality of door frames, and
wherein the ventilator fan is coupled to receive an output of at least one of the plurality of sensors, via the control means, so that the ventilator fan is switched on when a corresponding one of the plurality of doors is opened and as soon as an opening is created between the corresponding one of the plurality of doors and a corresponding one of the plurality of door frames in which the corresponding one of the plurality of doors is located, and
wherein each of the plurality of sensors comprises an optical sensor.

2. An apparatus according to claim 1, wherein the minimum output of each of the plurality of sensors is 0V and the maximum output of each of the plurality of sensors is 10V.

3. An apparatus according to claim 1, wherein the sensing means is connected to at least one window in the escape route, and wherein the at least one window is an internal window.

4. An apparatus for ventilating an escape route of a building, the apparatus comprising sensing means for detecting positions of a plurality of doors in the escape route of the building, and control means, coupled to a ventilator fan, for variably controlling a velocity of air leakage in the escape route of the building, using the ventilator fan, to be at least 2 ms$^{-1}$ based on the positions of the plurality of doors detected by the sensing means to maintain pressure in the escape route at a level sufficient to prevent ingress of smoke into the escape route from outside of the escape route when one or more of the plurality of doors are opened,
wherein the plurality of doors comprise sliding doors,
wherein the sensing means comprises a plurality of sensors, each respectively attached to a corresponding one of the plurality of doors, wherein each sensor is capable of sensing the position of the corresponding one of the plurality of doors to which it is fitted with respect to a corresponding one of a plurality of door frames, and
wherein the ventilator fan is coupled to receive an output of at least one of the plurality of sensors, via the control means, so that the ventilator fan is switched on when a corresponding one of the plurality of doors is opened and as soon as an opening is created between the corresponding one of the plurality of doors and a corresponding one of the plurality of door frames in which the corresponding one of the plurality of doors is located, and
wherein each of the plurality of sensors comprises a light emitter adapted to emit light towards a corresponding one of the plurality of doors, and a light detector for detecting light that is reflected back off the corresponding one of the plurality of doors.

5. An apparatus according to claim 1, wherein the control means further comprises a programmable logic controller, which is adapted, in use, to receive data relating to the position of at least one of the plurality of doors, and trigger the ventilator fan for creating the pressure differential in the escape route of the building.

6. An apparatus according to claim 1, wherein the apparatus is adapted to control a velocity of escaping gas/air/smoke across the faces of the doors in a burning building so that it is at least 2 ms$^{-1}$, on fire and ground floor doors.

* * * * *